United States Patent
Smith et al.

[15] 3,688,521

[45] Sept. 5, 1972

[54] CONSTANT VELOCITY UNIVERSAL JOINTS

[72] Inventors: Henry Thomas Smith, Whittington, near Lichfield; Thomas Hughes Millward, Sutton Coldfield, both of England

[73] Assignee: G.K.N. Birfield Transmission Limited, Birmingham, England

[22] Filed: March 10, 1971

[21] Appl. No.: 122,902

[30] Foreign Application Priority Data

May 1, 1970 Great Britain..........20,995/70

[52] U.S. Cl.........................................64/21, 29/434
[51] Int. Cl................................................F16d 3/10
[58] Field of Search ............................64/21; 29/434

[56] References Cited

UNITED STATES PATENTS

| | | |
|---|---|---|
| 3,367,139 | 2/1968 | Ristan............................64/21 |
| 3,452,558 | 7/1969 | Cull et al. ......................64/21 |
| 3,541,809 | 11/1970 | Howey............................64/21 |

*Primary Examiner*—Edward G. Favors
*Attorney*—Spencer & Kaye

[57] ABSTRACT

The outer member of a constant velocity universal joint is provided with a number of external grooves. The grooved outer member is then fitted within an end portion of a tube and the tube deformed inwardly so as to obtain a positive mechanical interlocking engagement between the outer member and the tube to hold the outer member against movement relative to the tube.

10 Claims, 4 Drawing Figures

PATENTED SEP 5 1972    3,688,521

INVENTORS
Henry Thomas Smith
Thomas Hughes Millward

BY *Spencer & Kaye*

ATTORNEYS.

CONSTANT VELOCITY UNIVERSAL JOINTS

BACKGROUND OF THE INVENTION a. Field of the Invention

This invention relates to the manufacture of constant velocity universal joints of the kind including an inner member and an outer member surrounding the inner member and adapted to be driven thereby, registering tracks formed respectively externally on the inner member and internally on the outer member, each pair of registering tracks being adapted to receive a torque-transmitting element such as a ball and means being provided for assisting in positioning the elements in the bisector plane of the joint.

b. Description of the Prior Art

Joints of the above kind are known in which the inner member has means whereby it can be carried on the end of a shaft, normally a solid shaft and the outer member is connected to a tubular shaft. Heretofore it has been the practice to form the closed end of the outer member so as to define a rearwardly projecting stud, that is to say the stud projects in the opposite direction to the shaft which carries the inner member and one end of the tubular shaft associated with the outer member is welded to this stud. Alternatively it has been the practice to form the outer member as a cylinder and to secure a disc or closure plate to one end of the cylinder, a rearwardly projecting stud being associated with the disc or closure plate and the tubular shaft again being connected to the stud.

With either of the two previous proposals referred to above it is necessary to carry out additional machining operations over and above those involved in the basic formation and track-forming of the outer member, thus making the manufacture of the outer member of the joint a relatively costly operation. It is therefore an object of the present invention to provide an improved method of manufacturing a joint of the kind referred to resulting in considerable economies.

SUMMARY OF THE INVENTION

The outer member of the joint has external formations, one end portion of the tubular shaft associated with the outer member has co-operating formations and the formations co-operate in such way that the outer member is keyed immovably within the end portion of the tubular shaft.

DESCRIPTION OF THE PREFERRED EMBODIMENT

Figure 2:
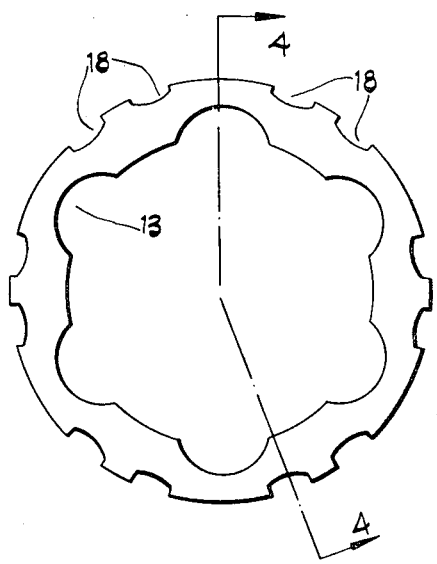
FIG. 2 is a transverse sectional view of the outer member of the joint.
Figure 3:
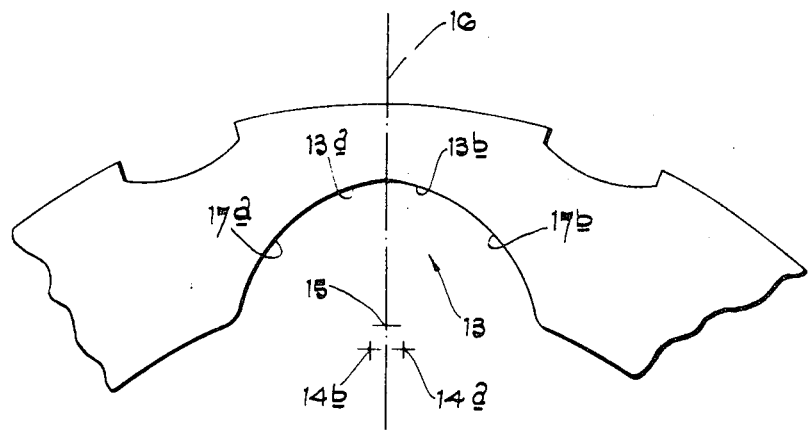
FIG. 3 is a detail view showing part of the joint outer member.
Figure 4:
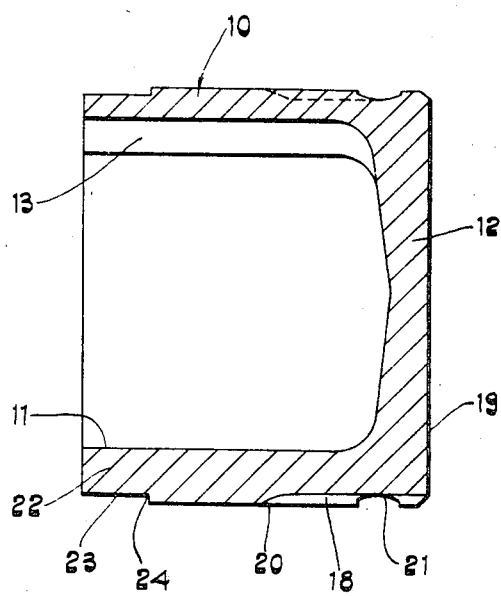
FIG. 4 is a sectional view of the joint outer member along the line 4—4 of FIG. 2.

The joint outer member shown in FIGS. 2, 3 and 4 is formed as a cold forging or cold extrusion and is of cup-shape form including a main part 10 providing a cylindrical bore 11 and an integral end closure 12. Internal track formations 13 are formed during forging or extrusion of the outer member, these track formations 13 being subsequently machined, case carburized or induction hardened, the tracks extending axially of the outer member so that, in the assembled joint, the inner and outer members are capable of relative axial as well as relative angular movements.

Each track formation 13 has a cross-section defined by a pair of arcs 13a and 13b and the two arcs 13a and 13b being struck off centers 14a and 14b which are spaced equal distances from a point 15 lying on the path of movement of the center of a ball moving along the track formation 13, the two points 14a and 14b being spaced equal distances on opposite sides of a line 16 which passed through the point 15 and through the point of intersection of the arcs 13a and 13b. With this arrangement the outer surface of a ball contained in the track formation 13 will engage the arcs 13a and 13b at positions 17a and 17b spaced substantially from the base and margin of the track formation 13 whereby the contact pressure ellipse is contained well within the space between the base and margin of the tracks.

The outer surface of the cylindrical part 10 of the outer member is formed to provide a plurality of angularly spaced axially extending grooves 18 and as can be seen from FIG. 2 there are a pair of such grooves 18 formed in that part of the outer surface of the outer member between a pair of track formations 13. This location of the grooves 18 in the spaced between the track formations 13 ensures that the part 10 of the outer member has an adequate wall thickness throughout its circumference. The grooves 18 do not extend for the full length of the cylindrical part 10, but extend from end face 19 of the end closure 12 to a position 20 intermediate the ends of the outer member. The axial grooves 18 are intersected by an annular groove 21 and said circumferential groove 21 is located at a position corresponding substantially to the inner ends of the track formations 13. The part 10 of the outer member includes a portion 22 of reduced wall thickness at the end thereof adjacent the open mouth of the bore 11 and this reduced wall thickness portion 22 serves to provide an annular rebate 23 having an outwardly facing shoulder 24.

The outer member shown in FIGS. 2, 3 and 4 is secured to a tubular shaft by fitting the outer member within one end portion of the tubular shaft so that the end face of the tubular shaft is flush with but does not overlap the shoulder 24. The tubular shaft end portion is then deformed inwardly as by electromagnetic pulse forming thereby the material of the tubular shaft is displaced inwardly so as to enter the axial grooves 18 and the circumferential groove 21 whereby the outer member is keyed to the tubular shaft and is fixed against axial movement or angular movement relative thereto.

In an alternative arrangement the end portion of the tubular shaft which is to be engaged with the outer member is formed to provide a series of axially extending inwardly directed projections corresponding to the grooves 18, the outer member is fitted into the end of the tubular shaft so that said projections enter the grooves 18 whereby the outer member is fixed against angular movement relative to the tubular shaft and then a suitable deforming operation is carried out to prevent any axial displacement between the tubular shaft and the outer member, e.g., by deforming the tubular shaft inwardly in the vicinity of the circumferential groove 21 to displace the material of the tubular shaft into said circumferential groove 21.

A construction as described above provides a simple effective shaft and outer member assembly for a constant velocity universal joint and although it may be necessary to use a transmission shaft of slightly greater diameter than has previously been the practice, the increased cost of having a shaft of greater diameter is more than offset by the saving in cost of the formation of the outer member itself and the subsequent attachment of the outer member to the shaft.

Figure 1:
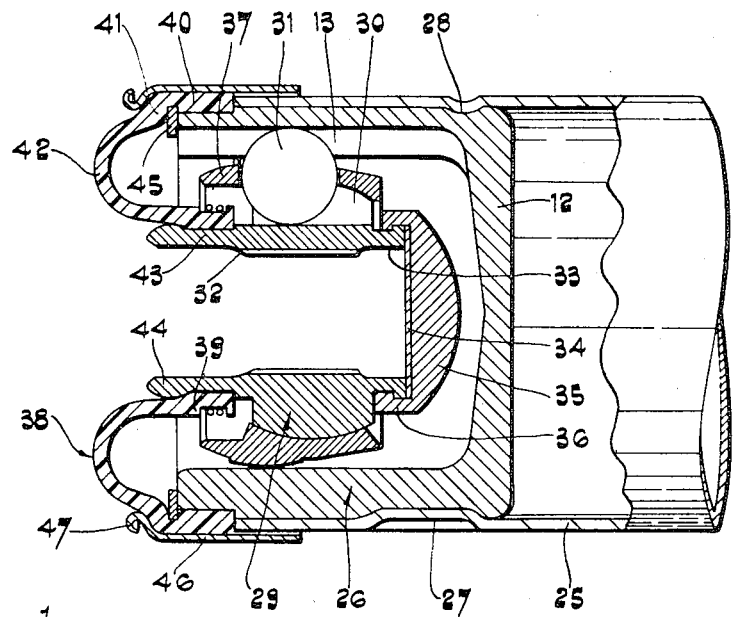
FIG. 1 is a sectional view of a constant velocity universal joint.

The universal joint as a whole is shown in FIG. 1 which illustrates one end portion of a propeller shaft assembly for a motor vehicle transmissions which comprises a tubular shaft 25 and a plunging constant velocity universal joint at each end thereof. The outer member 26 of the joint is constructed as described above in relation to FIGS. 2, 3 and 4 and as can be seen portions 27 and 28 of the shaft 25 are deformed inwardly so as to enter the axial grooves 18 and the circumferential groove 21 in the outer member 26.

The inner member 29 of the joint has a part-spherical outer surface which is machined to provide equi-angularly spaced grooves 30 which are parallel to the rotational axis of the inner member and the grooves 30 of the inner member 29 co-operate in pairs with the track formations 13 of the outer member 26 to provide ball tracks along which balls 31 move during relative angular and axial movements between the joint members.

The inner member 29 is provided with a bore 32 which, over a portion of its length, is internally splined so that it can have a splined connection with a driving or driven shaft (not shown) having a correspondingly splined portion. This correspondingly splined portion of the shaft is formed with an annular groove in which a spring clip is located and the spring clip is compressed as it passes through the splined portion of the bore 32 and then, when it reaches the inner end portion 33 of the bore 32, the clip expands resiliently so as to hold the shaft in engagement with the inner member 29.

The bore 32 in the inner member 29 is closed by an end plate 34 and a resilient pad 35 is fitted over the end plate 34 and includes a generally cylindrical portion 36 having an inturned lip which seats in an annular groove formed in the inner end part of the inner member 29.

A ball cage 37 with apertures in which the balls 31 are closely received is positioned between the inner and outer members 29 and 26 of the joint and acts to center the inner member 29 within the outer member 26. The configuration of the cage 37 and the configurations of the co-operating surfaces of the inner and outer members with which it engages are as described in Pat. Spec. No. 3,464,232 to which reference should be had.

A sealing member 38 of generally annular form is secured to the inner and outer members of the joint and the sealing member 38 includes an inner generally cylindrical portion 39 having a radial end lip, an outer generally cylindrical portion 40 adjacent which there is an increased thickness portion 41 and an arcuate portion 42 interconnecting said inner and outer generally cylindrical portions 39 and 40.

The inner member 29 of the joint includes a portion 43 onto which the generally cylindrical inner portion 39 of the sealing member 38 is secured by means of a fastener and, adjacent portion 43, the inner member 29 includes a portion 44 which is of increased cross-section compared with portion 43 and which is of arcuate form in longitudinal section. The sealing member 38 is originally formed so that the cylindrical inner portion 39 and the part of the sealing member adjacent thereto are substantially in alignment and the increased diameter portion 44 of the inner member 29 serves to bias the engaged part of the sealing member 38 outwardly relative to the axis of the inner member 29. In this way, when the joint is in use and axial movement takes place between the inner and outer members of the joint, the sealing member 38 will not tend to move inwardly into engagement with the shaft on which the inner member 29 is carried. When the shaft and joint are rotating at high speed, the part of the sealing member 38 nearest to the shaft will be urged centrifugally outwardly relative to the axis of the inner member 29 to prevent the sealing member 38 engaging the shaft at high speed.

The increased wall thickness portion 41 of the sealing member 38 serves to locate a washer 45 in engagement with the end face of the outer member 26 and the outer generally cylindrical portion 40 of the sealing member 38 is secured to the outer member 26 by means of a retaining sleeve 46 which is formed as, for example, a metal pressing and includes a lip portion 47 which, on assembly of the joint, is pressed inwardly towards the adjacent face of the outer member 26 so as to urge the washer 45 into engagement with the radial end face of the outer member 26.

The washer 45 is arranged so that it projects beyond the bases of the ball-receiving track formations 13 of the outer member 26, and as the washer 45 is urged resiliently by the sealing member 38 into engagement with the end face of the outer member 26, the washer 45 serves as a resilient end stop limiting the extent of axial movement of the balls 31 within the track formations 13 and thus limiting the amount of plunge of the inner member 29 relative to the outer member 26 in a direction outwardly of the shaft 25. The arrangement is such that, when the inner member 29 moves outwardly relative to the outer member 26 so that the balls 31 contact the washer 45, any further force tending to move the inner member outwardly relative to the outer member will be transmitted by engagement of the balls 31 with the washer 45 to the plunging joint at the other end of the shaft 25 resulting in movement of the outer member of the joint at that other end of the shaft 25 away from its associated inner member.

In an alternative construction one could delete the washer 45 and increase the section 41 of the sealing member 38 to provide abutment to the balls 31.

At the other end of each track formation 13, the extent of movement of the balls 31 is limited by engagement of the resilient end stop 35 with the adjacent part of the end wall 12 of the outer member 26.

After the outer member 26 has been secured to the shaft 25, the inner member 29 and the cage 37 are assembled and the assembly comprising the inner member 29 and cage 37 is then inserted in the bore 11 of the outer member 26. The sealing member 38 is attached to the inner member 29, either before or after insertion of the inner member 29 in the bore 11 of the outer member 26, such securement being effected by means of the fastener shown in FIG. 1 and the outer portion 40 of the sealing member 38 is then fitted over the end of the outer member 26 so as to enter the rebate 23 and to abut the shoulder 24 of the outer member. The washer 45 has previously been assembled with the sealing member 38 and is then in a position in engagement with the end face of the outer member 26. The retaining sleeve 46 is then fitted over the sealing member 38 and is secured to the end portion of the tubular shaft 25 as by spot-welding or by electromagnetic pulse-forming and the lip portion 47 of the sealing member 46 is pressed inwardly to urge the washer 45 resiliently into engagement with the end face of the outer member 26. The joint is lubricated prior to final fastening of the sealing member 38.

A sealed joint is thus provided at the end of the propeller shaft tube and the connection of the joint to its associated driving or driven shaft can be effected at the position at which the driving or driven shaft is located merely by causing the splined portion of the driving or driven shaft to enter the splined bore of the joint inner member 29 so that the spring clip carried by the splined portion of the driving or driven shaft becomes engaged in the increased diameter portion 33 of the bore 32 in the inner member 29.

Although the inner member 29 is preferably formed with a splined bore for reception of a splined portion of the associated driving or driven shaft, the inner member may be formed integrally with its associated driving or driven shaft and the driving or driven shaft may be formed with a flanged end plate which is formed with apertures to receive bolts for the bolting thereof to a flanged driving or driven shaft.

Although the invention has been described above in detail in relation to the production of a constant velocity universal joint in which the inner member is capable of plunging movement relative to the outer member, the invention can also be applied to universal joints in which no relative axial movement is permitted between the inner and outer members of the joint.

A propeller shaft assembly may include a tubular shaft and a plunging or fixed constant velocity universal joint constructed as described at one end of the shaft and another such joint or Hooke's joint or a center bearing stud-piece at the other end of the shaft.

We claim

1. In a method of manufacturing a constant velocity universal joint and shaft assembly of the kind which includes an outer member and an inner member interconnected by torque-transmitting elements which move along groove-like tracks formed in the inner and outer members upon relative angular movement therebetween and wherein the outer member is secured to a tubular shaft, the improvement which comprises, forming the outer member of the joint with external recesses offset circumferentially from said tracks of said outer member and of a radial depth less than that of said tracks, and deforming one end portion of the tubular shaft, to produce radially inwardly projecting portions engaging in said recesses whereby the outer member is fixed within said tubular shaft against rotation and axial movement relative thereto.

2. A method according to claim 1 wherein said recesses in outer member comprise a series of external angularly spaced axially extending grooves, and at least one circumferentially extending external groove.

3. A method according to claim 1 wherein the outer member is formed as a cup-shaped forging, the internal groove-like tracks and the external recesses of which are formed during the forging operation.

4. A method according to claim 1 wherein the outer member is formed as a cup-shaped extrusion, the internal tracks and the external recesses of which are formed during the extrusion operation.

5. A method according to claim 3 wherein, after the forging operation, the internal tracks of the outer member are machined and hardened.

6. A method according to claim 4 wherein the internal tracks of the extruded outer member are machined and hardened.

7. In a constant velocity universal joint and shaft assembly including an inner member and an outer member surrounding the inner member registering groove-like tracks formed respectively externally on the inner member and internally on the outer member, each pair of registering tracks being adapted to receive a torque-transmitting element, means for assisting in positioning the elements in the bisector plane of the joint when relative angular displacement between the inner and outer members occurs, the inner member having means whereby it can be carried on the end of a shaft and the outer member being connected to a tubular shaft, the improvement wherein the outer member has external recesses offset circumferentially from said tracks of said outer member and of a radial depth less than that of these tracks, and one end portion of the tubular shaft has co-operating deformed portions projecting radially inwardly into said external recesses in said outer member to key the outer member within said end portion of the tubular shaft and to fix it against rotation and axial movement relative thereto.

8. A joint and shaft assembly according to claim 7 wherein the inner member has a splined bore for connection to its associated drive shaft and a flexible sealing member acts between the inner and outer members of the joint and includes a generally cylindrical inner portion fitted on the inner member and a generally cylindrical outer portion fitted on the outer member of the joint.

9. A joint and shaft assembly according to claim 8 wherein the tracks formed in the outer member are longitudinally straight tracks, the tracks formed in the inner member arc longitudinally straight tracks and the inner member is free to move axially relative to the outer member, resilient means being mounted on the inner member to close the inner end of said splined bore and to co-operate with a solid wall of the outer member to limit relative axial movement between the inner and outer members in one direction and the flexible gaiter providing means mounting a washer in abutment with an end face of the outer member, said washer being disposed in overlapping relation with the open outer end of the tracks in the outer member and co-operating with the torque transmitting elements movable along said tracks to limit relative axial movement between the inner and outer members in the opposite direction.

10. A joint and shaft assembly according to claim 7 wherein
 a. said outer member is of cup shape and has a side wall defined by concentric inner and outer surfaces of generally circular form except for said tracks and said recesses, and has an end wall, b. said recesses comprise axially extending grooves formed in portions of said outer member between successive tracks where the wall thickness of said outer member is undiminished by the presence of said tracks, c. said recesses further comprise a circumferential groove adjacent to that end of said outer member at which said end wall is provided.

* * * * *